Aug. 17, 1965 L. G. F. JONES 3,201,769

INFORMATION STORAGE DEVICE

Original Filed May 4, 1951 3 Sheets-Sheet 1

*INVENTOR.*
LAWRENCE G.F. JONES

Charles C. English
AGENT

INVENTOR.
LAWRENCE G.F. JONES

Charles C. English
AGENT

Aug. 17, 1965 L. G. F. JONES 3,201,769

INFORMATION STORAGE DEVICE

Original Filed May 4, 1951

3 Sheets-Sheet 3

*INVENTOR.*
LAWRENCE G.F. JONES

BY Charles E. English

AGENT

United States Patent Office 3,201,769
Patented Aug. 17, 1965

3,201,769
INFORMATION STORAGE DEVICE

Lawrence G. F. Jones, Baltimore, Md., assignor to Sperry Rand Corporation, New York, N.Y., a corporation of Delaware Original application May 4, 1951, Ser. No. 224,610, now Patent No. 2,787,750, dated Apr. 2, 1957. Divided and this application June 6, 1956, Ser. No. 589,617
15 Claims. (Cl. 340—174.1)

This invention relates to a high speed memory device and/or system adapted for use with electronic computing apparatus, having for an object the provision of a novel stimuli-receiving and inducing sleeve or bearing member and a coacting high speed drum. This application is a division of my copending application "Information Storage Device," Serial No. 224,610, filed May 4, 1951, now Patent No. 2,787,750, and is assigned to the assignee of said copending application.

There have been previously known arrangements for storing information on and delivering information from a magnetically susceptible surface situated on the periphery of a revolving drum. It has been the practice to suspend the shafts supporting such drums in conventional bearing assemblies, and to mount the magnetic recording and pick-up heads cooperating with the drum surface at a point or points along the drum remote from such bearing surfaces.

In general, the surfaces present in the journal or bearing assembly have played no part in the arrangement for storing and delivering information. Since rotating drums, when used for the storage and delivery of information, must be rotated at very high speeds, of the order of 20,000 r.p.m. or more, to minimize the delay in referring to a desired item of information, it is not practical to operate the assembly with the recording-pickup head in physical contact with the active surface of the drum. To do so would rapidly wear away either the operating head or the drum surface or both. It is therefore necessary to introduce a clearance between the magnetic head and the active surface of the drum which is at least equal to the maximum drum eccentricity to be anticipated, the maximum deformation in drum structure to be expected at high speeds, plus a safety factor. Separation of the magnetic head from the active surface of the drum reduces the density with which information may be recorded upon and picked up from the drum surface, so that these expedients materially reduce the available storage capacity on a given drum.

In brief, these problems are met by the arrangement of the invention through the incorporation of the magnetic recording-pickup heads in the structure of the bearing itself, which is the point at which minimum clearances are encountered. As, in one of the embodiments of the invention, a bearing utilizing a fluid (e.g. air) film may be employed, the clearances may be very small, so the drum expansion at very high speeds may bring the drum surface into engagement with the interior of the bearing sleeve. Arrangements will be disclosed which avoid this possibility.

Accordingly, one of the principal objects of the invention is to provide a new and novel information storage system for efficiently utilizing the available active magnetic surface.

Another object of the invention is to provide new and novel apparatus for regulating clearances in a journal or bearing.

The invention broadly contemplates the provision of an improved high speed memory system designed and adapted for incorporation into electronic computer apparatus of the type described in publication of the McGraw-Hill Book Company, New York, N.Y., entitled "High Speed Computing Devices," 1st edition, issued 1950.

The high speed memory system contemplated by the present invention lends itself particularly to incorporation in the high speed computing devices of the type described in the above-referred to publication, and constitutes an improvement over the devices described in the latter.

In accordance with the present invention, a stimuli or memory-inducing and receiving sleeve or static member is provided which is adapted to coact with a high speed, rotatable member or drum revolving at speeds which may, for example, exceed 50,000 r.p.m. It will be understood, as hereinafter described, that each revolution of the drum will entail the production or reception of one or more electric pulses or stimuli that are impressed on or induced by a plurality of magnetic heads embedded in the sleeve, each head being capable of receiving or inducing an individual stimulus.

Referring now to the drawings.

Figure 2:
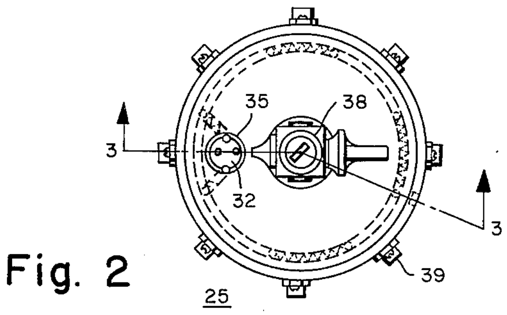
FIGURE 2 is a plan view of the device.
Figure 9:
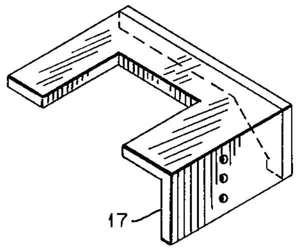
FIGURE 9 is a perspective view of the bracket which serves as a stop for the static sleeve member.
Figure 1:
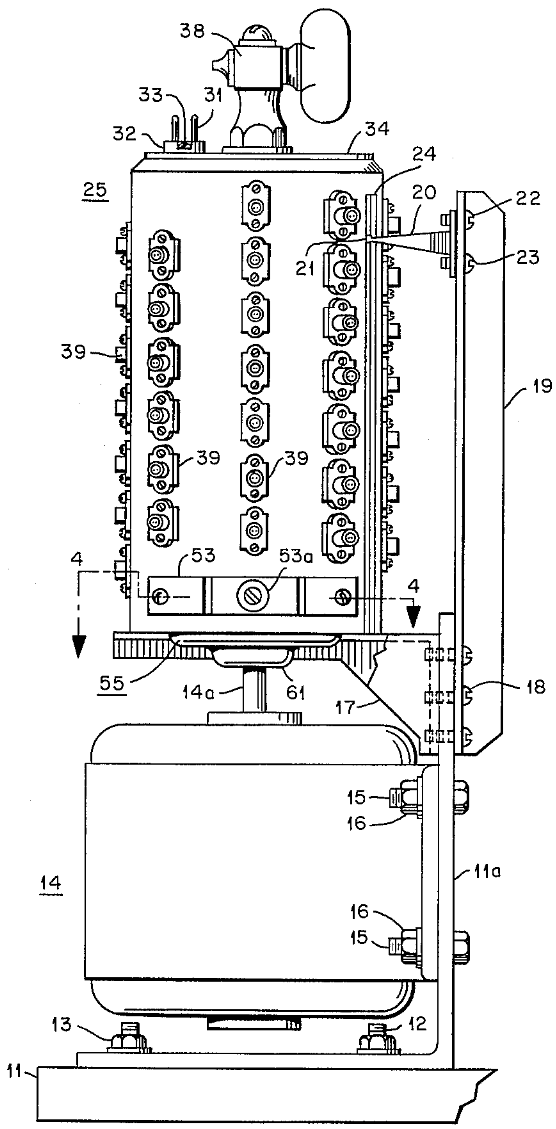
FIGURE 1 is an elevational view, with certain parts broken away for clarity of illustration, depicting an embodiment of the invention operatively coupled to a driving motor and incorporating means operative to associate it with electronic circuit control means.

Refer now to FIGURE 1. To the bracket 11*a*, the frame of a synchronous electric motor, designated generally at 14 and having a shaft 14*a*, is fastened by screws and nuts 15 and 16. On the upper portion of the bracket 11*a*, a U-shaped member or bracket 17 is fastened as by the screws 18, and to the latter bracket, in turn, an angle bar 19 is also secured by the same screws 18. The bracket 17 also serves as a stop for a stationary sleeve member hereinafter described more fully. To the upper part of the angle bar 19, a finger 20 having a ball point 21 is fastened by screws 22 and 23. The finger 20 is adapted to ride in a vertically disposed guide or groove 24 arranged in the cylindrical wall of a stimuli-receiving and inducing sleeve, designated generally at 25. The vertically disposed guide or groove 24 extends to the lower edge of the sleeve 25 so that the ball point 21 of finger 20 may ride upward in the groove to its indicated position as the sleeve 25 is lowered vertically over the drum 55 during assembly. Since there is a hydrodynamic thin air film between the sleeve 25 and the drum 55 the viscous drag of this thin air film caused by the high rotational speed of the drum 55 would tend to cause the sleeve 25 to rotate by virtue of the fluid coupling. Such sleeve rotation is prevented by the finger 20 fastened to the angle bar 19.

Figures 3, 4, 5, 8, 10:
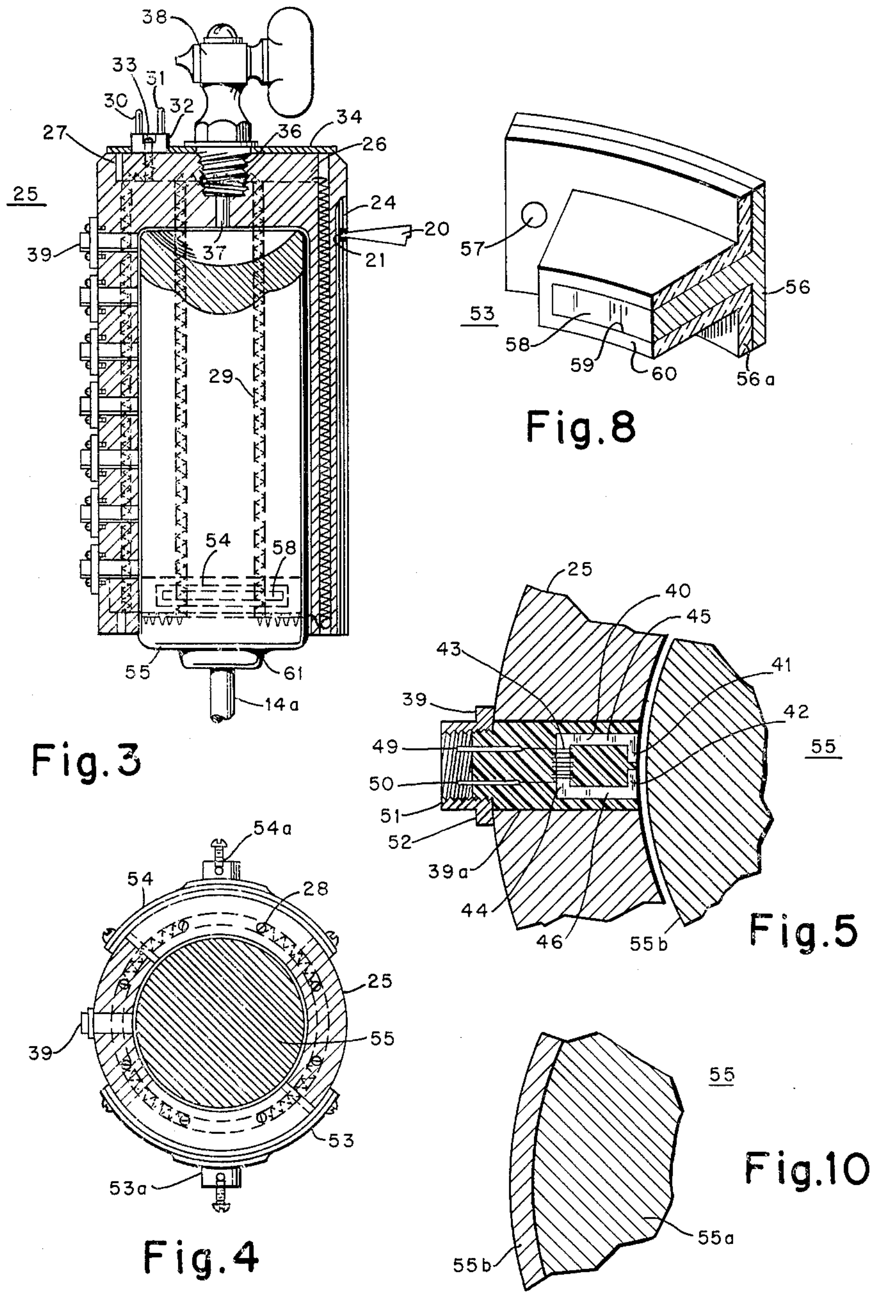
FIGURE 3 is a longitudinal sectional view taken on line 3—3 of FIGURE 2, and as seen in the direction of the arrows.
FIGURE 4 is a transverse sectional view, taken on line 4—4 of FIGURE 1, looking in the direction of the arrows.
FIGURE 5 is an enlarged, fragmentary sectional detail view of adjacent portions of the sleeve and drum and disclosing one of the impulse receiving heads.
FIGURE 8 is a fragmentary enlarged perspective view, partly in section, of one of the two similar capacitor elements fastened to the lower portion of the sleeve bearing member.
FIGURE 10 is an enlarged, fragmentary sectional view of the high speed drum showing, on a magnified scale, the magnetically-permeable plating or sheath on the periphery of the drum.

Referring now to FIG. 3, the upper end of the sleeve 25 is closed by a web or top 26 formed integrally therewith and is provided with longitudinally stretching channels or passageways 28 accommodating the windings or convolutions of a resistance coil 29 whose ends are connected to prongs 31 of a plug 32. The plug 32 which permits the coil 29 to be coupled to a source of electric energy (not shown) when desired, is fastened to the web 26 by a screw 33. The annular recess 27 is normally closed by a cover 34 having an opening 35 to accommodate the body portion of the plug 32.

The web or top 26 of the sleeve 25 has a centrally-positioned threaded opening 36 communicating with a reduced passageway 37 opening into the interior of the sleeve 25. The opening 36 accommodates a manually operable valve 38 that serves to admit air to the interior of the sleeve.

As shown in FIGURE 3 and FIGURE 4, adjacent the lower end of the sleeve 25, and embedded therein so as to present a substantailly flush continuation of its inner periphery, is a pair of capacitor elements 53, 54 which coact with a metallic, air-supported high speed rotatable drum 55, located within said sleeve and hereinafter described more fully, to provide a variable capacitor. This capacitor is connected to and serves to affect or regulate an electronic circuit that in turn is effective to regulate the speed of the synchronous driving motor 14 fastened to the drum alluded to by shaft **14*a***.

Each of the capacitor elements 53, 54 as shown in cross-section by FIGURE 8 includes a metallic body portion 56, of an approximately T-shaped contour, secured to suitable insulating material **56*a*, as by the screws 57. The insulating material 56*a* also has a configuration adapted to conform to the metallic body portion which has a laterally-extending tongue 58, accommodated in a slot 59 formed in a rib 60 of the insulating material. The outer edge or surface of the metal tongue 58, it is to be understood, is in alignment and merges with the adjacent outer edges of the insulating material defining the slot 59; and, when the capacitor element is operatively attached to the sleeve 25, the said outer edge of the tongue 58 is smoothly flush with the inner periphery of the latter and in extremely close proximity to the outer periphery of the rotatable drum 55. By means of the construction described, it will be understood that the capacitor elements 53, 54 are individually insulated from the body portion of the sleeve 25**.

In further accordance with the invention, the sleeve 25 is provided with a plurality of stimulus-receiving and inducing, magnetic-recording members or heads 39, best shown in cross-section in FIGURE 5 embedded in the sleeve 25 and arranged thereon in staggered or helical fashion. This helical or staggered positioning of the magnetic-recording heads is designed to afford their closer spacing so that a greater number may be employed, if desired.

The interior of the bearing sleeve is preferably honed and lapped after the insertion of the magnetic recording-reproducing heads. The exterior of the drums may then be finished to fit within the resultant opening with the required degree of precision. While the sleeve mounting has been illustrated as a floating mount, this is not essential to the realization of the advantages of the invention which may be retained as well with a rigidly supported sleeve.

Each head 39 includes a body portion **39*a* formed of a suitable nonconducting or insulating substance such as plastic material, celluloid and the like, in which is embedded a substantially rectangular-shaped armature element or core 40, formed of a preferably paramagnetic alloy or metal. The armature 40 has its ends or poles 41, 42 arranged in closely-spaced, opposed relation and has a winding or coil 43 encircling its central reach 44 that connects with arms 45, 46 terminating in the above-mentioned inwardly-directed and opposed pole ends 41, 42**.

The ends of the coil winding are attached to a pair of circuit-completing prongs 49, 50 protruding externally from the plastic body portion of its respective head and located with a collar or bushing 51 threadedly engaged with a reduced exterior portion of the body portion of the said head. The collar 51 has an outer annular flange 52 which seats snugly on the periphery of the sleeve 25.

The high speed drum 55 as shown in FIGURE 10, comprises a cylindrical body portion **55*a* which may be of any suitable alloy or metal, but preferably of the highest tensile and strain-resistant properties, as, for example, stainless steel, and a thin plated sheath or coating 55*b* of a magnetically permeable material adapted to receive and retain magnetic stimuli so that information and data may be both received and transmitted by the instant device and for use with electronic computing devices of the general type alluded to above. A 0.0002 inch layer of nickel-cobalt alloy has been found suitable for the coating 55*b*. Reference to FIGURE 1 shows the reduced hub portion 61 at the lower end of drum 55 which is adapted to accommodate and securely retain the shaft 14*a* of the motor 14**.

The mode of controlling the expansion and contraction of the sleeve proportionately to the expansion and contraction of the high speed rotating drum, and also of regulating the speed of the synchronous motor in such wise as to gradually accelerate it to the enormous r.p.m. for which it is intended and then to correspondingly decelerate it, has been generally alluded to above.

Figures 6, 7:
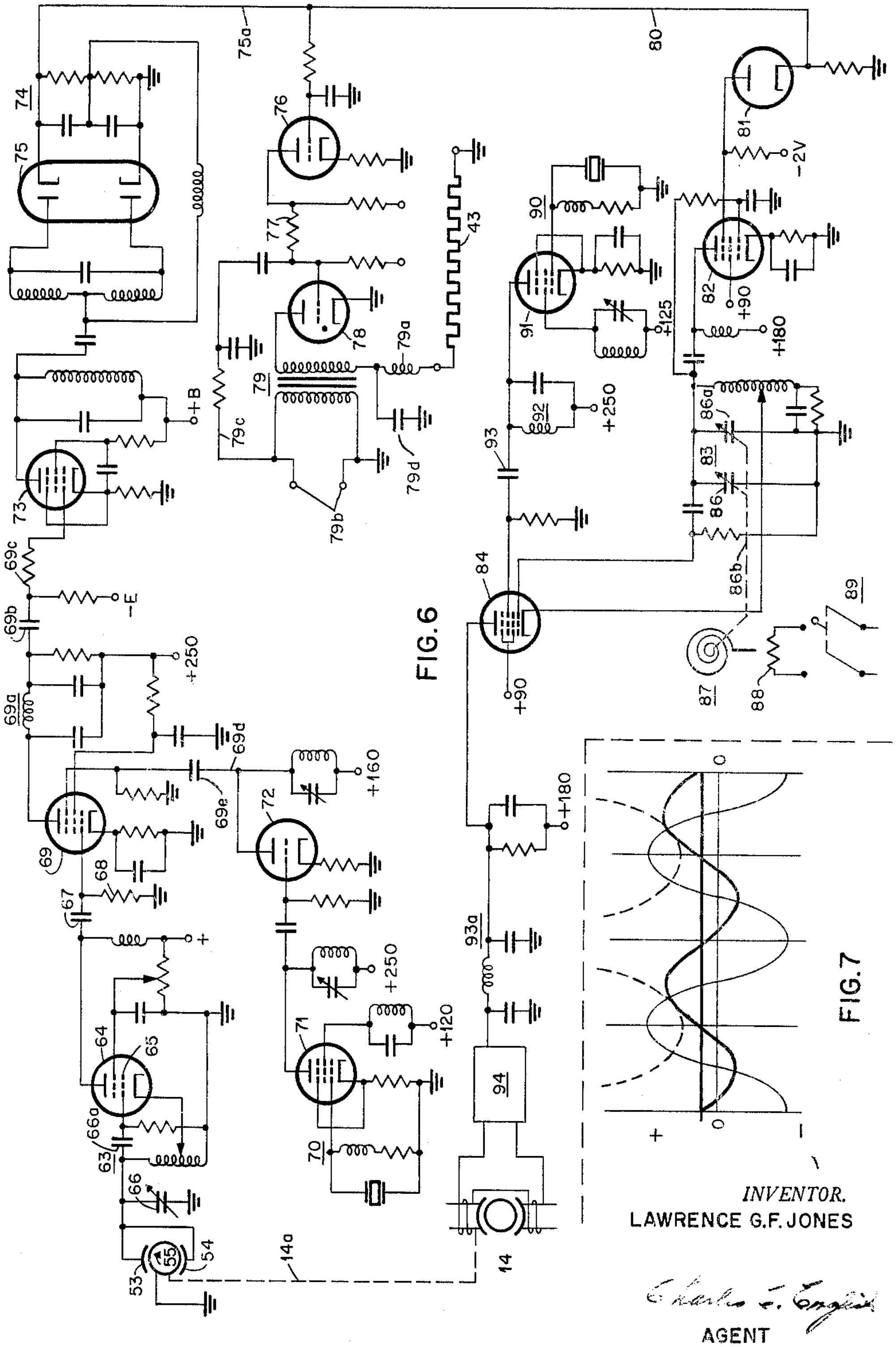
FIGURE 6 is a diagrammatic representation of the electric circuit controlling the thermal expansion of the sleeve and the speed of the motor to the shaft of which the drum is secured.
FIGURE 7 is a graphical representation of the phase relations of the several voltages applied to the thyratron which regulates the heating of the sleeve.

The electronic control means employed for attaining the objectives mentioned is shown in FIGURE 6 and utilizes oscillatory and associated circuits whose interlocked outputs are selectively applied to control circuits. One of these circuits is associated with a thermally-responsive assembly, hereinafter described more fully and has an independent branch circuit effective to gradually accelerate and decelerate the motor over a space of time sufficient to permit the correspondingly gradual heating or cooling of the resistance coil 29 in the sleeve 25 in order that the latter may vary its dimensions proportionately to the drum, and thus maintain an extremely close, yet uniform, spacing between the sleeve and the said drum.

Referring now to FIGURE 6, an oscillatory circuit is indicated generally at 63. This includes a pentode 64 whose control grid 65 is coupled to a capacitor formed by interaction between the high speed drum 55 and the pair of connected capacitor elements 53, 54 on the sleeve 25. In order to regulate or confine the oscillatory circuit 63 to a desired range of frequencies, a variable capacitor 66 is connected in parallel with the capacity formed by the elements 53, 54 and the drum 55, so that, after a desired preliminary setting of the manually variable condenser 66, the capacity between the drum and sleeve will be substantially the sole factor in varying the frequency of the said oscillatory circuit 63. A capacitor **66*a* completes the connection of the control grid 65 of the pentode 64** with the oscillatory circuit.

As best shown in FIGURE 4, each of the capacitor elements 53, 54 has fastened thereto a binding post **53*a*, 54*a* having a set screw to secure its respective lead to the capacitor 66**.

The output of the pentode 64 of the oscillating circuit 63 is coupled, via condenser 67 and resistor 68, to a mixer valve 69 where it is combined, via lead **69*d* and capacitor 69*e*, with the output of a crystal-controlled oscillator circuit 70 which includes the pentode 71 and an associated doubler circuit having the triode 72**.

The signal from the mixer 69 is applied, via an inductance-capacity low pass filter circuit **69*a*, coupling condenser 69*b* and resistance 69*c***, to an amplifier valve 73 whose output is fed to a conventional discriminator circuit, indicated generally at 74, and including the duodiode 75. The output of the latter is fed, via the lead 75*a*, to an inverter 76 coupled in turn, via the resistor 77 to the grid of a thyratron 78 whose anode is connected to one end of the secondary winding of a transformer 79. The other end of the same transformer winding is connected through an inductance 79*a* to the resistance or heater coil 43 in the sleeve 25. The inductance 79*a* is associated with a grounded capacitor 79*d* and functions therewith as a hash filter to prevent radiation interference.

The primary winding of the transformer 79 is coupled to and energized by a 60 cycle source of electric energy 79*b* and is also connected to a resistance capacity filter section, indicated generally at 79*c*, in turn connected to the control grid of the thyratron 78. When the thyratron is fired, via the circuit components indicated above, it will be effective to apply a heating current or pulse to the coil 43 in order to variably heat same in order to vary the diametral dimensions of the sleeve 25.

The voltages delivered to the thyratron 78, and the circumstances under which it is fired, as mentioned above, are indicated in FIGURE 7. The sine wave, indicated in light outline, and which oscillates about the zero axis, represents the potential applied to the anode of the thyratron. The sine wave curve shown in heavy outline represents the A.C. component of the potential impressed upon the control grid of the thyratron, and oscillates about the axis shown in heavy outline which represents the D.C. potential impressed from the inverter tube 76 upon the control grid of the thyratron. The curve delineated by the dashed line represents the control grid potential required to trigger the thyratron.

The output of the discriminator circuit 74 is also delivered via the lead 80, with an interlocking circuit network, which includes the diode 81 connected to a reactance valve 82 coupled to an inductance-capacity circuit 83 in turn connected to a pentode 84 serving as oscillator and mixer valve.

The circuit 83 includes two variable condensers 86, 86*a*, the shaft or other equivalent component of the latter being mechanically connected or linked, as indicated by the dashed line 86*b*, to the bimetallic blade or expansion coil of a thermostat assembly, denoted diagrammatically at 87, which may be of conventional construction. A heater resistance 88, associated with the bimetal 87, is connected through a switch 89 to a suitable A.C. supply source which may be independent of the electronic control means employed in this invention.

The thermostat assembly 87, it will be understood, is enclosed in a housing (not shown) of temperature-resistant material so that there will be an appreciable time lag with respect to temperature changes after the resistance winding 88 has conditioned the thermostat coil or element to slowly turn the shaft of the variable condenser 86*a* to vary its capacity in order to bring the synchronous motor 14 to the high r.p.m. desired in this system, and maintain it substantially thereat while the device is in operation. When the bimetal 87 has reached a sufficient temperature, further change in the capacitor 86*a* is prevented by an adjustable stop, settable to regulate the drum speed.

The mixer tube 84 receives the output of a crystal-controlled oscillator circuit (indicated generally at 90) which includes pentode 91 whose plate circuit 92 is coupled, via the capacitor 93, to the said mixer tube 84. The beat frequency from the mixer tube 84 is applied via the filter circuit, indicated generally at 93*a*, to an amplifier 94 whose output, in turn, is coupled to the synchronous motor 14 whose shaft 14*a* is mechanically connected, as indicated by the dashed line 14*a* in FIGURE 6, with the high speed drum 55.

A sprocket channel may be incorporated on the drum to provide the desired relationship between the information on the drum and the time sequences observed in the circuits external thereto; its output would be applied to conventional phase detector circuits to feed the input of the reactance valve 82.

The manner of operation of the device has in part been indicated above, but will be more fully understood from the following explanation:

The starting operation will best be understood by reference to FIGURE 6. In the absence of heat from the resistor 88, the spiral bimetallic element 87 maintains the capacitor 86*a* in its maximum capacity position. The oscillations generated by the interelectrode assembly of the mixer valve 84 under these conditions may be approximately 30 cycles per second higher than the oscillations generated by the crystal-controlled oscillator 90, both of the oscillators operating in the region of 100 kilocycles per second. This insures that under stand-by conditions the synchronous motor 14 will be excited at a frequency of 30 cycles per second and thus the drum 55 will be driven at stand-by at a speed of 1800 r.p.m. This relatively low constant speed keeps the air or other fluid lubricant film intact, preventing metal-to-metal contact between the drum and the embracing sleeve.

The apparatus is placed in service by closing the switch 89 which excites the heater 88, gradually warming the bimetallic element 87, which drives the variable capacitor 86*a* in the circuit 83 associated with the valve 84 toward its minimum capacity position. The thermal time constant of the bimetallic element and resistor assembly may be relatively long, for example, of the order of 10–15 minutes. At the end of this time period, the capacitor 86*a* abuts an adjustable stop limiting the decrease in capacity. As the frequency of the oscillations generated by the interelectrode assembly of the valve 84 is higher than that developed in the crystal-controlled oscillator 90, the gradual motion of the bimetallic element 87 gradually increases the frequency applied to the synchronous motor 14 from 30 cycles per second to, say, 1000 cycles per second, when the motor 14 revolves at 60,000 r.p.m. By virtue of the connection 14*a* to the drum 55, the drum 55 is caused to revolve at the same speed.

As the speed of rotation of the drum 55 increases, centrifugal force causes an expansion thereof bringing its rotating periphery into closer association with the capacitor electrodes 53, 54. These electrodes control the frequency developed by the oscillator valve 64 which may normally operate at a frequency of about 20 megacycles per second. Increasing speed of the rotor 55 diminishes the operating frequency of the oscillator 64, and thus reduces the frequency applied to the inner control grid of the valve 69.

The oscillatory output of the valve 69 is combined with the output of the frequency doubler 72 whose input may be excited from the crystal-controlled oscillator 70. The suitable value for the frequency of the oscillator 70 would be 15 megacycles per second which, after doubling, results in a frequency of 30 megacycles per second at the output of the valve 72. A different frequency of, nominally, ten megacycles per second appears in the output of the valve 69 and is delivered through the low pass filter 69*a* to the control grid of a valve 73 driving a discriminator assembly. The output frequency from the mixer 69 increases from its center value of 10 megacycles per second in response to the expansion of the rotor 55 and the discriminator 74 is so connected that under these conditions, i.e. increasing an input frequency above ten megacycles per second, the line 75*a* is driven negative.

The control grid of the valve 76 is fed, through a resistance-capacitance filter, from the line 75*a* and the increasingly negative bias diminishes the flow of anode current through the valve 76 to apply progressively more positive potentials to the control grid of the thyratron 78 through the coupling resistor 77. An increasingly positive reference potential on the control grid of the thyratron 78 increases the flow of current in its anode circuit and hence the flow of current through the heater 43 associated with the bearing shell. This increases the inner diameter of the bearing shell tending to restore the initial clearance.

In the meantime, however, the bimetallic element 87 continues to drive the capacitor 86*a* towards it minimum capacity position, and as this capacity decreases at too great a rate, the speed of the drum, and its diameter, may increase at a greater rate than the increase in the inner diameter of the bearing shell from the heat developed in the resistor 43. Damage from this source is prevented by the connection of the line 75*a* to the cathode of the diode 81, which is normally nonconductive. However, when the line 75*a* becomes more than two volts negative, conduction is established through the diode 81 to apply a more negative potential to the auxiliary control grid of the reactance valve 82 diminishing the lagging current drawn by this valve from the oscillatory circuit including the capacitors 86 and 86*a*. This control action reduces the frequency developed by oscillatory action in the inter-electrode assembly of the mixer valve 84, thereby opposing further increase in the output frequency of the mixer 84 which would be caused by continuing change in the value of the capacitor 86*a*.

The control action exerted by the reactance valve 82 is proportioned to override the action of the capacitor 86*a* under these conditions thus preventing further increase in the drum speed until the inner diameter of the bearing shell has increased sufficiently to release the oscillator 84 from such supervisory control. When restoring the apparatus to stand-by condition, the switch 89 is opened thereby cutting off the source of electric energy from the resistor 88; whereupon the bimetallic element 87 slowly cools reducing the beat frequency in the anode circuit of the valve 84 and gradually returning the speed of the rotor 55 to its standby speed of 1800 r.p.m.

It will, of course, be understood that the description and drawings herein contained are illustrative merely, and that various modifications and changes may be made in the structure disclosed without departing from the spirit of the invention.

What is claimed is:

1. In combination, magnetic transducer means, a cylindrical magnetic recording medium adapted for rotation about its axis and past said transducer means, a member supporting said transducer means and enclosing said medium in spaced relationship thereto, a fluid interposed between said medium and said member, said fluid being moved along with said medium at a speed sufficient to provide bearing support between said medium and said member for maintaining said transducer means in spaced relationship to said medium during rotation of said medium.

2. In combination, magnetic transducer means, a magnetic recording medium adapted for motion past said transducer means, a support member for said transducer means, and a fluid between said medium and said member and carried by the motion of said medium so that motion imparted to said fluid by said medium maintains said member in substantially constant spaced relationship to said medium.

3. In combination, a plurality of magnetic transducers, a cylindrical magnetic recording medium adapted for rotation about its axis and past said transducers, a member in bearing support relation to and enclosing said medium, said bearing support relationship being provided by a fluid bearing established in response to the rotation of said medium, said member supporting said transducers and maintaining them in spaced relationship to said medium, said transducers being so disposed about said member that each of said transducers may be magnetically associated with a different circular band on the cylindrical surface of said magnetic recording medium.

4. In combination, magnetic transducer means, a magnetic recording medium in close spaced relation to said transducer means, means for producing relative motion between said transducer means and said recording medium, a fluid interposed between said transducer means and said recording medium said transducer means and said recording medium being operable to form from said fluid a bearing therebetween in response to said relative motion for maintaining said transducer means out of physical contact with said recording medium.

5. A magnetic memory device comprising a cylindrical magnetic recording medium, a magnetic transducer in close spaced relation to said recording medium, means for supporting said transducer, means for producing relative motion between said recording medium and said support means in manner to product between said recording medium and said support means a fluid film which is such as to maintain said close spaced relationship.

6. In combination, a transducer means, a recording medium in close spaced relation to said transducer means, means for producing relative motion between said transducer means and said recording medium, a fluid between said transducer means and said recording medium operable in response to the relative motion of said means and said medium to form a fluid film therebetween for maintaining said close spaced relation.

7. A recording apparatus comprising a bearing member carrying a recording element, a movable recording medium, means for moving said recording medium proximate said bearing member to move ambient fluid against said member, mounting means for said member and said medium allowing variations in the spacing between said member and said medium, and responsive to the force of said ambient fluid moved by said medium to provide spacing between said member and said medium while maintaining recording communication therebetween.

8. In combination, a cylindrical magnetic recording medium adapted for rotation about its axis, magnetic transducer means, a cylindrical member supporting said magnetic transducer means in recording relationship with said medium, a fluid interposed between said member and said medium, said fluid forming a fluid bearing between said member and said medium in response to rotation and said member to maintain said transducer means in constant recording relationship to said medium.

9. In combination, magnetic transducer means, a cylindrical magnetic recording medium adapted for rotation about its axis, a member enclosing said medium, said member having a cylindrical interior surface, said transducer means being supported by said member to be flush with said interior surface of said member, and a fluid interposed between said member and said medium to form a fluid bearing therebetween in response to rotation of said medium, said fluid bearing being effective to maintain a close spaced relationship between said transducer and said medium.

10. A magnetic recording system comprising a first recording element including a magnetic recording medium, a second recording element including a magnetic transducer for reading and writing signals on said recording medium, a fluid between the surfaces of said recording elements, means moving one of said elements in a certain direction and at a speed sufficient to provide a certain movement to form a film of said fluid adjacent said one of said elements, means for supporting the other of said recording elements with its surface having a certain close spaced relation to said surface of said one recording element and to be movable toward and away from said one recording element and transverse to said certain direction of movement, said means for supporting said other recording element including means for constraining said other element from movement with said moving film and for positioning said other element upon movement away from said close spaced relationship to be acted upon by said moving film to be returned thereto, whereby said moving film is operative to maintain said close spaced relation for the reading and writing of signals on said recording medium by said magnetic transducer.

11. In combination, a first record receiving element, a second record producing element, a fluid interposed between said first and second elements, means for maintaining a desired uniform clearance between said elements for transmission of signals therebetween, said clearance maintaining means including means providing relative motion between said first and second elements to cause said elements to scan one another and to establish therebetween by virtue of the motion of one of said elements a rapidly moving film of said fluid effective to maintain said desired clearance.

12. In combination, a magnetic drum mounted for rotation about a fixed axis, a magnetic recording and reproducing head, means for mounting said head to prevent rotation of said head about the axis of said drum and to allow lateral motion of said head toward and away from said drum to allow positioning of said head to a desired small clearance with the surface of said drum, a fluid interposed between said drum surface and said head, and means rotating said drum at a speed sufficient to establish between said drum surface and said head by virtue of the rotation of said drum a high velocity film of said fluid operable to maintain said desired small clearance.

13. In combination, magnetic transducer means, a magnetic recording medium of circular cross section adapted for rotation about its axis and past said transducer means, a member supporting said transducer means and enclosing said medium in spaced relationship thereto, a fluid interposed between said medium and said member, said fluid being moved along with said medium at a speed sufficient to provide bearing support between said medium and said member for maintaining said transducer means in spaced relationship to said medium.

14. In combination, a plurality of magnetic transducers, a cylindrical magnetic recording medium adapted for rotation about its axis and past said transducers, a cylindrical member enclosing said medium in bearing support relation thereto, said member supporting said transducers in recording relationship to said medium, a fluid interposed between said member and said medium for forming a fluid bearing therebetween in response to the motion of said fluid during rotation of said medium to maintain said transducers in spaced relationship to said medium, said transducers being disposed about said member along a helical path, the axis of said helical path coinciding with the cylindrical axis of said member.

15. The combination according to claim 14 wherein said member comprises a cylindrical sleeve the inner surface of which is closely spaced from said medium.

References Cited by the Examiner

UNITED STATES PATENTS

| | | | |
|---|---|---|---|
| 2,038,216 | 4/36 | Harrison et al. | 179—100.2 X |
| 2,144,844 | 1/39 | Hickman | 79—100.2 |
| 2,512,372 | 6/50 | Pakala | 318—6 X |
| 2,540,654 | 2/51 | Cohen et al. | 346—74 |
| 2,603,539 | 7/52 | Brewster | 179—100.2 X |
| 2,671,700 | 3/54 | Seyffert | 179—100.2 X |
| 2,700,588 | 1/55 | Williams et al. | 346—74 |
| 2,708,693 | 5/55 | Hendrickson | 179—100.2 |

IRVING L. SRAGOW, *Primary Examiner.*

NEWTON N. LOVEWELL, L. MILLER ANDRUS, STEPHEN W. CAPELLI, *Examiners.*